US 12,305,567 B2

United States Patent
Brumberg et al.

(10) Patent No.: US 12,305,567 B2
(45) Date of Patent: May 20, 2025

(54) GEAR COVER AND GEAR HOUSING SYSTEM

(71) Applicant: Cummins Inc., Columbus, IN (US)

(72) Inventors: Matthew D. Brumberg, Scipio, IN (US); Christofer Durkin, Columbus, IN (US); Ruchita Ashok Karewar, Pune (IN)

(73) Assignee: Cummins Inc., Columbus, IN (US)

( * ) Notice: Subject to any disclaimer, the term of this patent is extended or adjusted under 35 U.S.C. 154(b) by 28 days.

(21) Appl. No.: 18/461,847

(22) Filed: Sep. 6, 2023

(65) Prior Publication Data

US 2023/0407781 A1 Dec. 21, 2023

Related U.S. Application Data

(63) Continuation of application No. PCT/US2022/071176, filed on Mar. 16, 2022.
(Continued)

(51) Int. Cl.
*F02B 67/04* (2006.01)
*F01M 11/03* (2006.01)
*F02F 7/00* (2006.01)

(52) U.S. Cl.
CPC .............. *F02B 67/04* (2013.01); *F01M 11/03* (2013.01); *F02F 7/0043* (2013.01)

(58) Field of Classification Search
CPC ......... F02B 67/04; F02B 67/06; F01M 11/03; F02F 7/0043; F16H 2057/0203;
(Continued)

(56) References Cited

U.S. PATENT DOCUMENTS 4,607,601 A * 8/1986 Kohler .................. F01L 1/02
123/90.31
5,000,142 A 3/1991 Aruga et al.
(Continued)

FOREIGN PATENT DOCUMENTS

| CN | 102392753 A | 3/2012 |
|---|---|---|
| CN | 106678325 A | 5/2017 |

(Continued)

OTHER PUBLICATIONS

International Search Report and Written Opinion, PCT/US22/071176, Dec. 1, 2022, 17 pgs.

*Primary Examiner* — Yi-Kai Wang
(74) *Attorney, Agent, or Firm* — Taft Stettinius & Hollister LLP

(57) ABSTRACT

A gear housing assembly includes a gear housing and a gear cover for an internal combustion engine. The gear housing includes gear housing drillings, the gear cover includes gear cover drillings, wherein the gear cover is attached to the gear housing such that one of the gear cover drillings is fluidly connected with one of the gear housing drillings via a gasketed interface to supply oil through a debris screen to two fuel pumps mounted on the gear housing. A serviceable access cover is mounted on the gear cover. An idler gear is assembled onto an idler shaft to form a sub-assembly, wherein the idler gear is positioned between the serviceable access cover and the gear housing. The idler shaft is supported by the bushing in the access cover and two bushings mounted in the gear housing to provide radial and thrust load bearing capabilities.

20 Claims, 12 Drawing Sheets

Related U.S. Application Data

(60) Provisional application No. 63/164,015, filed on Mar. 22, 2021.

(58) Field of Classification Search
CPC ........... F16H 57/031; F16H 2057/0235; F16H 57/0404; F16H 57/0424
USPC ....................................................... 123/509
See application file for complete search history.

(56) References Cited

U.S. PATENT DOCUMENTS

| | | |
|---|---|---|
| 2018/0010492 A1 | 1/2018 | Shirakawa |
| 2018/0080352 A1 | 3/2018 | Patel |
| 2018/0283328 A1 | 10/2018 | Mukohara et al. |

FOREIGN PATENT DOCUMENTS

| | | |
|---|---|---|
| DE | 20122465 U1 | 10/2005 |
| WO | 2019117891 A1 | 6/2019 |

* cited by examiner

GEAR COVER AND GEAR HOUSING SYSTEM

CROSS-REFERENCE TO RELATED APPLICATIONS

The present application is a continuation of International PCT Application No. PCT/US22/71176 filed on Mar. 16, 2022, which claims the benefit of the filing date of U.S. Provisional Application No. 63/164,015 filed on Mar. 22, 2021, which are incorporated herein by reference in their entirety for all purposes.

TECHNICAL FIELD

The present application relates generally to a gear housing assembly that includes a gear housing attached to a gear cover, wherein the gearing housing assembly supplies oil through a debris screen that removes debris to two fuel pumps mounted directly on the gear housing and a removable access cover mounted on the gear cover enables service of a simply-supported idler gear.

BACKGROUND

Often a small adapter housing is coupled to a single fuel pump wherein the adapter housing is bolted onto a gear housing to mount the fuel pump on the gear housing. Typically, a single fuel pump must have sufficient capacity to pump the fuel required for internal combustion engine operation. For any fuel system there is always a concern about debris from the oil passing into the fuel pump and thereby damaging the fuel pump. Typically, a removable "rock catcher" or debris screen is placed in the adapter housing so that large debris from the oil that is being fed to the fuel pump is filtered out before the debris enters the fuel pump to prevent damage to the fuel pump. The rock catcher is removable from the adapter housing to clean the debris out.

The geartrain transfers crankshaft rotational movement to the various other driveshafts of accessory pumps and engine sub-systems. Typically, idler gears are utilized to link all driveshafts, whereby all rotational forces are transferred via the gear teeth meshes. The geartrain assembly is positioned within the gear housing and can be difficult to service.

Therefore, further contributions in this area of technology are needed to supply a low cost alternative to a single fuel pump while maintaining adequate oil flow through a gear housing assembly that is easily accessible for service of the gear train assembly. Therefore, there remains a significant need for the apparatuses, methods and systems disclosed herein.

SUMMARY

One embodiment is a unique system, method, and apparatus that includes a gear housing assembly including a gear housing and a gear cover for an internal combustion engine, the gear housing including a plurality of gear housing drillings, the gear cover including a plurality of gear cover drillings, wherein the gear cover is attached to the gear housing such that one of the plurality of gear cover drillings is fluidly connected with one of the plurality of gear housing drillings via a gasketed interface between the gear housing and the gear cover. In one embodiment, the gear housing assembly further comprising: a debris screen positioned in one of the plurality of gear cover drillings. In one embodiment, the gear housing assembly further comprising: a first fuel pump attached directly to the gear housing, wherein one of the plurality of gear housing drillings is fluidly connected to the first fuel pump; and a second fuel pump attached directly to the gear housing, wherein another one of the plurality of gear housing drillings is fluidly connected to the second fuel pump.

In yet another embodiment, a system comprising: a gear housing assembly including a gear housing connected to a gear cover for the internal combustion engine; an access cover mounted on the gear cover, wherein the access cover is removable from the gear cover; and an idler gear positioned between the access cover and the gear housing, the idler gear is visible when the access cover is removed from the gear cover. In one embodiment, the system further comprising: an idler shaft having a front end opposite a rear end, wherein the idler gear is assembled onto the idler shaft; the front end of the idler shaft is supported on an idler shaft bushing assembled with the access cover; the rear end of the idler shaft is supported by a first top hat bushing and a second top hat bushing mounted in the gear housing to thereby provide radial and thrust load bearing capabilities.

According to another embodiment, a system comprising: a gear housing assembly including a gear housing connected to a gear cover for an internal combustion engine; an access cover mounted on the gear cover, wherein the access cover is removable from the gear cover; and an idler gear assembled onto an idler shaft to form a sub-assembly, the idler gear positioned between the access cover and the gear housing; wherein the idler shaft includes a front end opposite a rear end, the front end of the idler shaft is supported by the access cover, the rear end of the idler shaft is supported by a first top hat bushing and a second top hat bushing mounted in the gear housing to thereby provide radial and thrust load bearing capabilities.

This summary is provided to introduce a selection of concepts that are further described below in the illustrative embodiments. This summary is not intended to identify key or essential features of the claimed subject matter, nor is it intended to be used as an aid in limiting the scope of the claimed subject matter. Further embodiments, forms, objects, features, advantages, aspects, and benefits shall become apparent from the following description and drawings.

BRIEF DESCRIPTION OF THE DRAWINGS

The concepts described herein are illustrative by way of example and not by way of limitation in the accompanying figures. For simplicity and clarity of illustration, elements illustrated in the figures are not necessarily drawn to scale. Where considered appropriate, references labels have been repeated among the figures to indicate corresponding or analogous elements.

DETAILED DESCRIPTION OF ILLUSTRATIVE EMBODIMENTS

Figure 1:
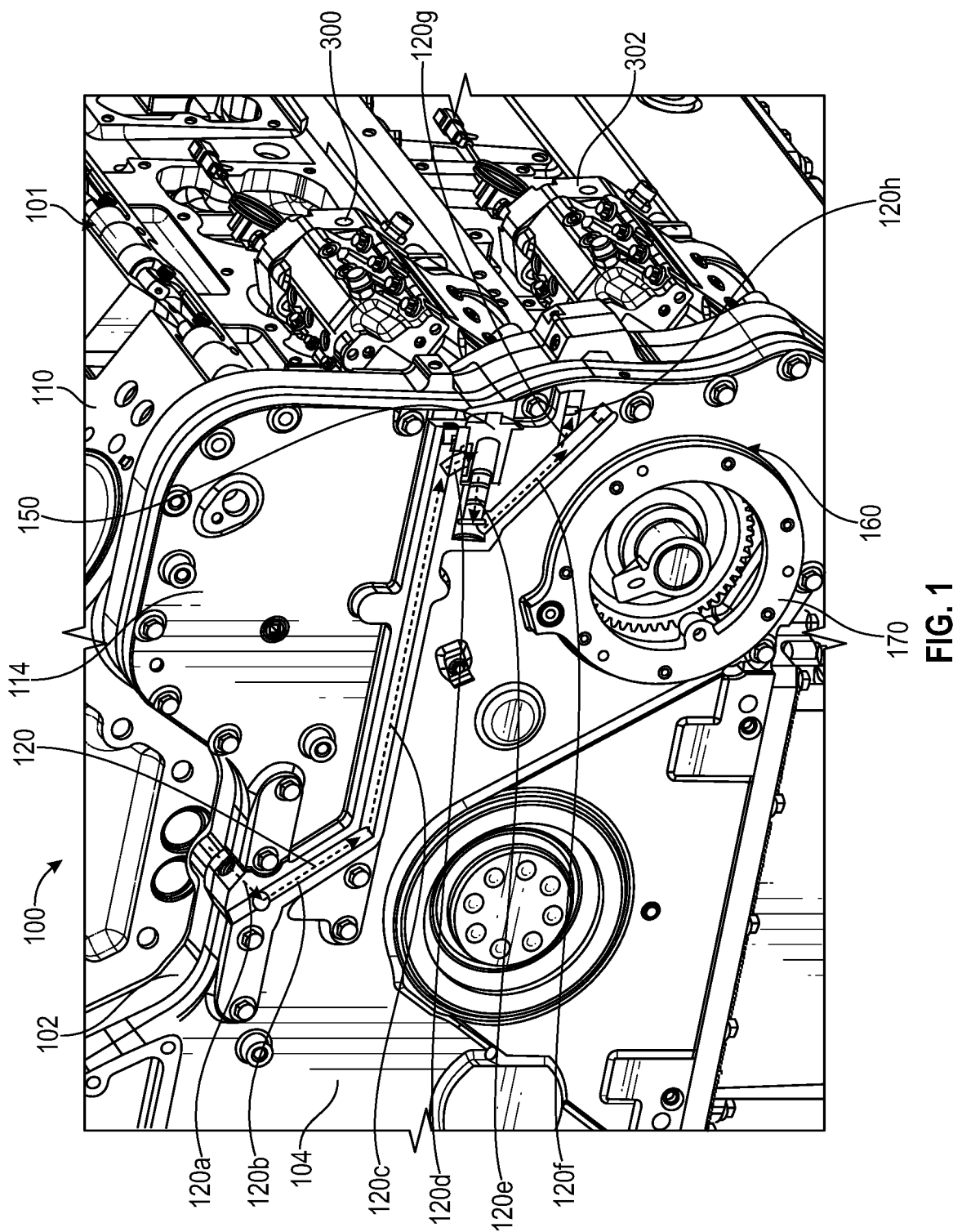
FIG. 1 is a cross-sectional view of a gear housing assembly showing drillings.

For the purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated embodiments, and any further applications of the principles of the invention as illustrated therein as would normally occur to one skilled in the art to which the invention relates are contemplated herein.

Figure 2:
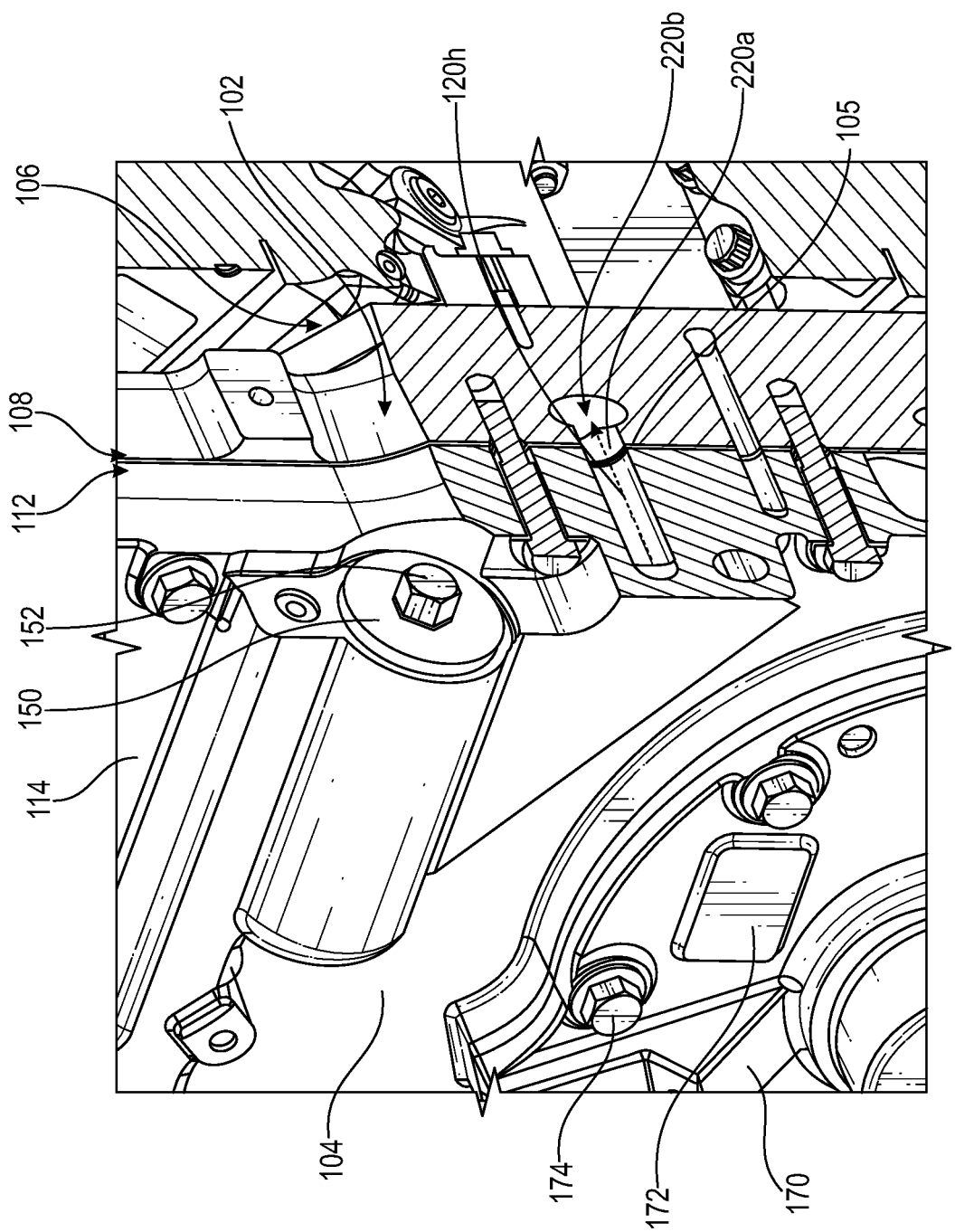
FIG. 2 is a partial perspective cross-sectional view of the gear housing assembly of FIG. 1.
Figure 3:
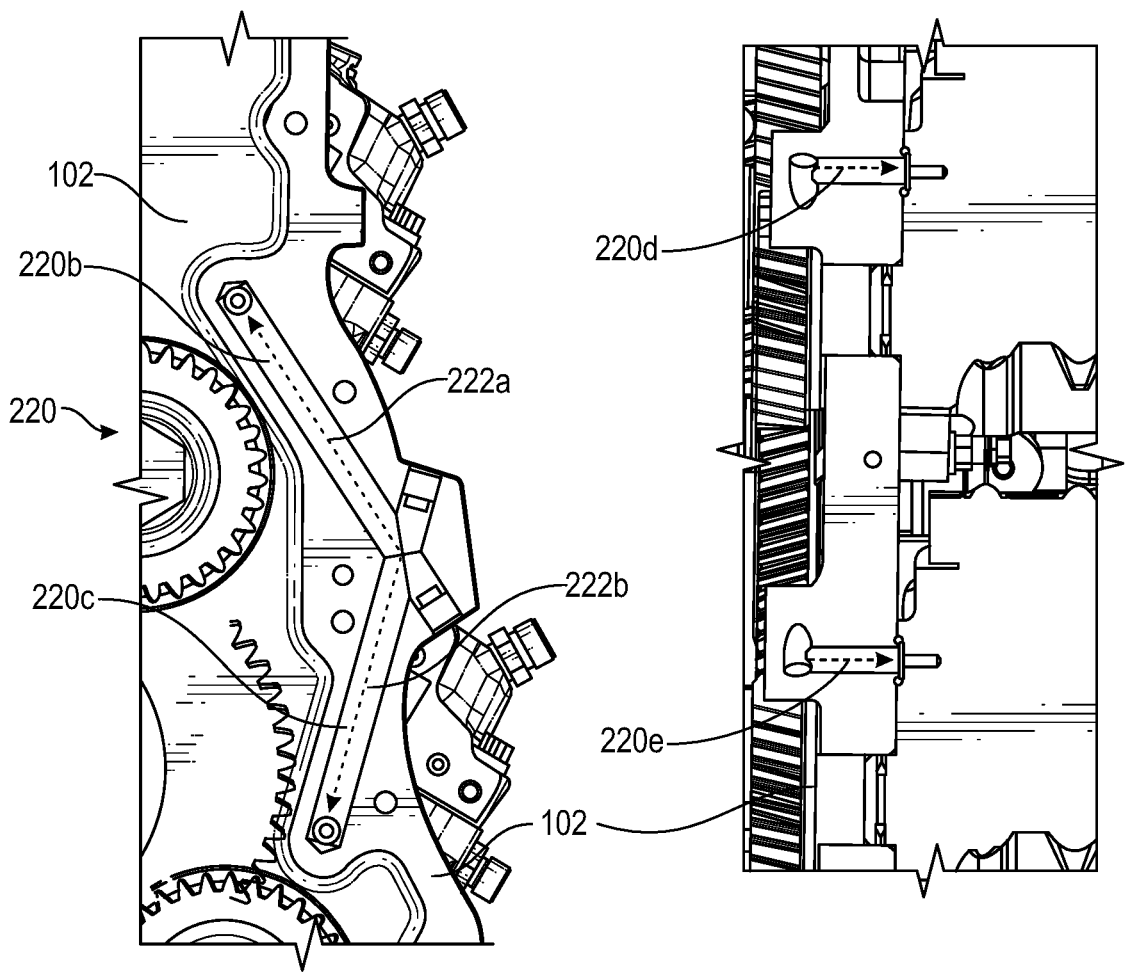
FIG. 3 is a cross-sectional view of the gear housing assembly with a gear cover removed of FIG. 1.

Referring to FIGS. 1-6, a gear housing assembly 100 is shown for use with an internal combustion engine 101. The gear housing assembly 100 includes a gear housing 102 assembled with a gear cover 104 with a gasketed interface 105 between the gear housing 102 and the gear cover 104 as illustrated in FIG. 2.

The gear housing 102 includes a rear face 106 that is configured for assembly with a cylinder block 110. The gear housing 102 includes a front face 108 opposite the rear face 106 with a depth that spans between the front face 108 and the rear face 106. The front face 108 is configured for attachment to the gear cover 104 and forms one face of the gasketed interface 105.

The gear cover 104 includes a rear face 112 that is configured for attachment to the front face 108 of the gear housing 102 and forms one face of the gasketed interface 105. The gear cover 104 includes a front face 114 opposite the rear face 112 with a depth that spans between the front face 114 and the rear face 112.

Figure 4:
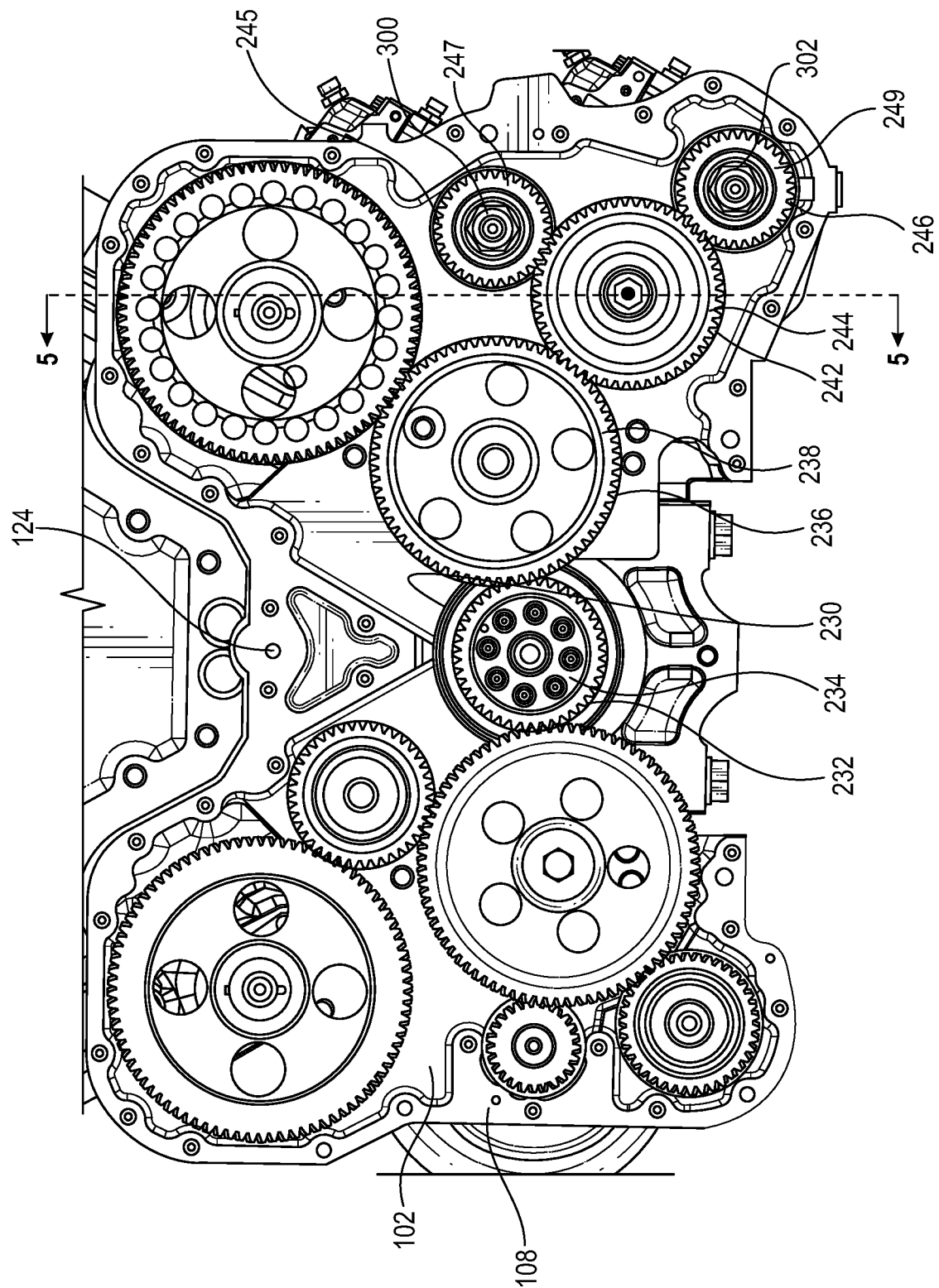
FIG. 4 is a partial perspective front view of the gear housing assembly with the gear cover removed showing a gear train of FIG. 1.

The gear cover 104 includes a plurality of gear cover drillings 120 that are fluidly connected to an oil rifle in cylinder block 110 thru cylinder block rifle thru passage 124 in the gear housing 102 illustrated in FIG. 4. The oil flow path is represented by a dashed line that runs along the length of the plurality of gear cover drillings 120 as illustrated in FIG. 1.

The plurality of gear cover drillings 120 can include any number of individual gear cover drillings. In the illustrated embodiment, the plurality of gear cover drillings 120 include a first gear cover drilling 120*a* that is fluidly aligned with cylinder block oil rifle thru passage 124 when the gear cover 104 is assembled with the gear housing 102. The first gear cover drilling 120*a* splits oil into two oil drilling planes or two oil circuits.

The first circuit of oil drillings feed oil to the fuel pumps, the second circuit of oil drillings feed oil to the idler shaft bushings. The plurality of gear cover drillings 120 include a second gear cover drilling 120*b* that fluidly engages with the first gear cover drilling 120*a* and a third gear cover drilling 120*c*. The plurality of gear cover drillings 120 include a third gear cover drilling 120*c* that fluidly engages with the second gear cover drilling 120*b* and a fourth gear cover drilling 120*d*. The plurality of gear cover drillings 120 include a fourth gear cover drilling 120*d* that fluidly engages with the third gear cover drilling 120*c* and a fifth gear cover drilling 120*e*. The fourth gear cover drilling 120*d* is fluidly aligned and connected to a debris screen 150 that is positioned in a fifth gear cover drilling 120*e*.

The plurality of gear cover drillings 120 include a fifth gear cover drilling 120*e* that fluidly engages with the fourth gear cover drilling 120*d* and a sixth gear cover drilling 120*f*. The fifth gear cover drilling 120*e* is sized and configured to retain the debris screen 150 therein. The plurality of gear cover drillings 120 include a sixth gear cover drilling 120*f* that fluidly engages with the fifth gear cover drilling 120*e* and a seventh gear cover drilling 120*g*. The plurality of gear cover drillings 120 include a seventh gear cover drilling 120*g* that fluidly engages with the sixth gear cover drilling 120*f* and an eighth gear cover drilling 120*h*.

The plurality of gear cover drillings 120 include an eighth gear cover drilling 120*h* that fluidly engages with the seventh gear cover drilling 120*g*. The eighth gear cover drilling 120*h* is approximately perpendicular to the seventh gear cover drilling 120*g*. The eighth gear cover drilling 120*h* is aligned with a first gear housing drilling 220*a* in the gear housing 102. The eighth gear cover drilling 120*h* aligns with the first gear housing drilling 220*a* to form mating cross drillings across the gasketed interface 105 such that the oil flows from the eighth gear cover drilling 120*h* through the first gear housing drilling 220*a*.

A debris screen 150 is positioned in the fifth gear cover drilling 120*e*. The debris screen 150 is a serviceable fine mesh filter configured to trap large particle debris in the oil as the oil flows through the plurality of gear cover drillings 120 before the oil passes rearward to the gear housing 102. The debris screen 150 includes a removable end 152 that enables removal of the debris screen 150 from the fifth gear cover drilling 120*e* for service or cleaning of the trapped particle debris caught in the oil in the debris screen 150.

The gear cover 104 includes an idler shaft opening 160 sized to receive an access cover 170. The gear cover 104 includes one or more bolt holes (not illustrated) to receive a corresponding number of bolts 174 to mount the access cover 170 to the gear cover 104.

Figure 7:
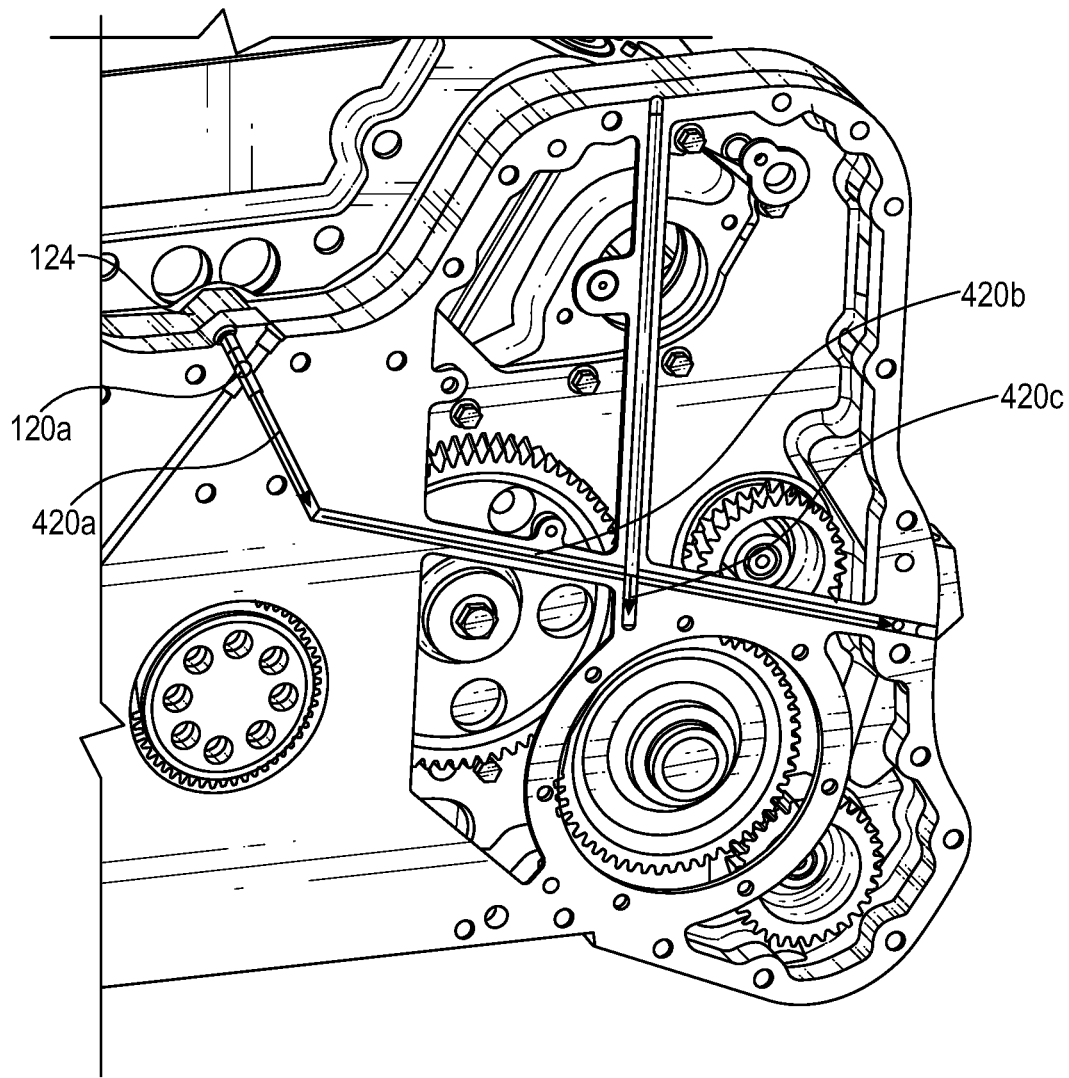
FIG. 7 is a partial perspective cross-sectional view of the gear housing assembly of FIG. 1.
Figure 8:
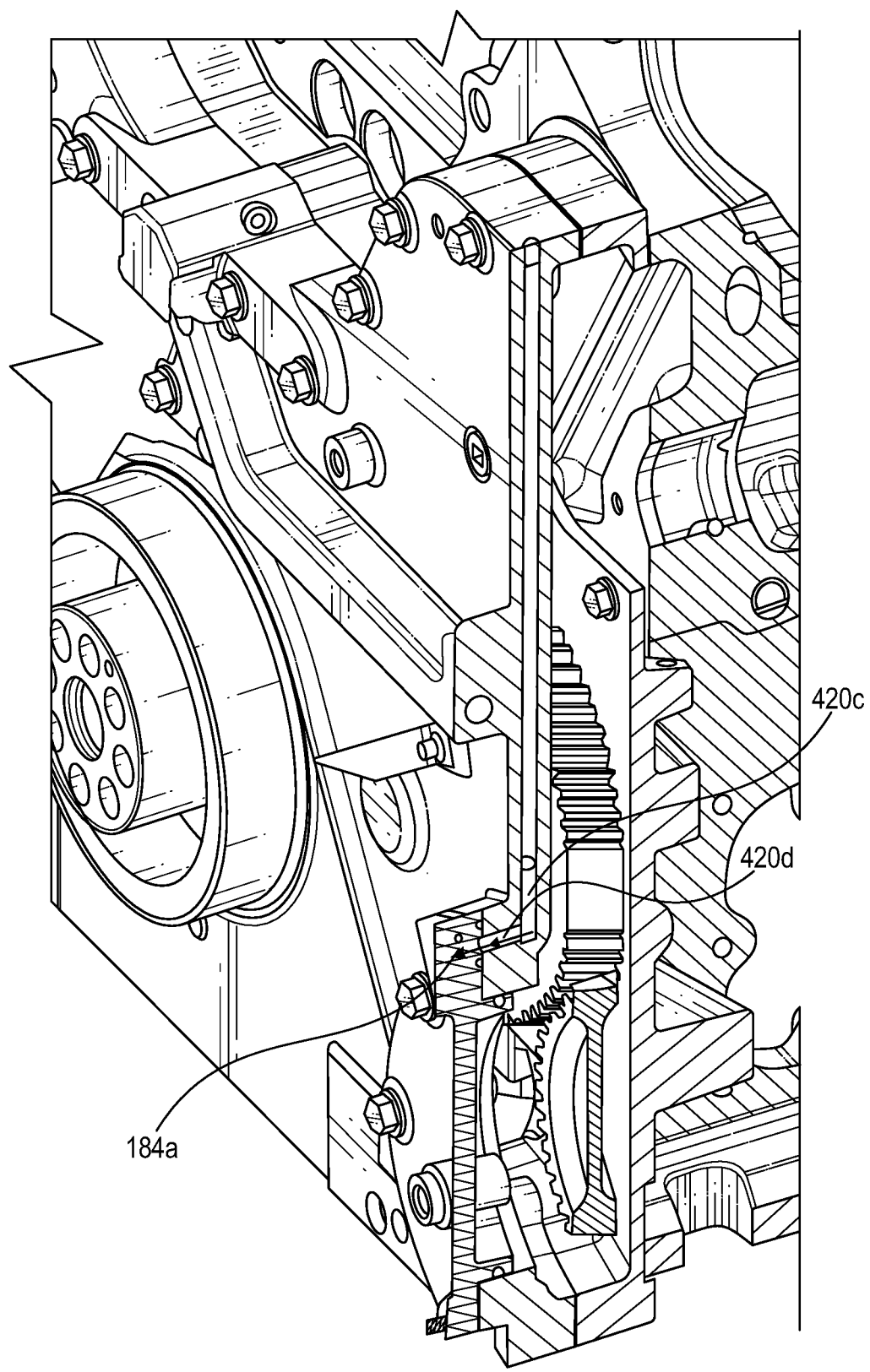
FIG. 8 is a partial perspective cross-sectional view of the gear housing assembly of FIG. 1.
Figure 9:
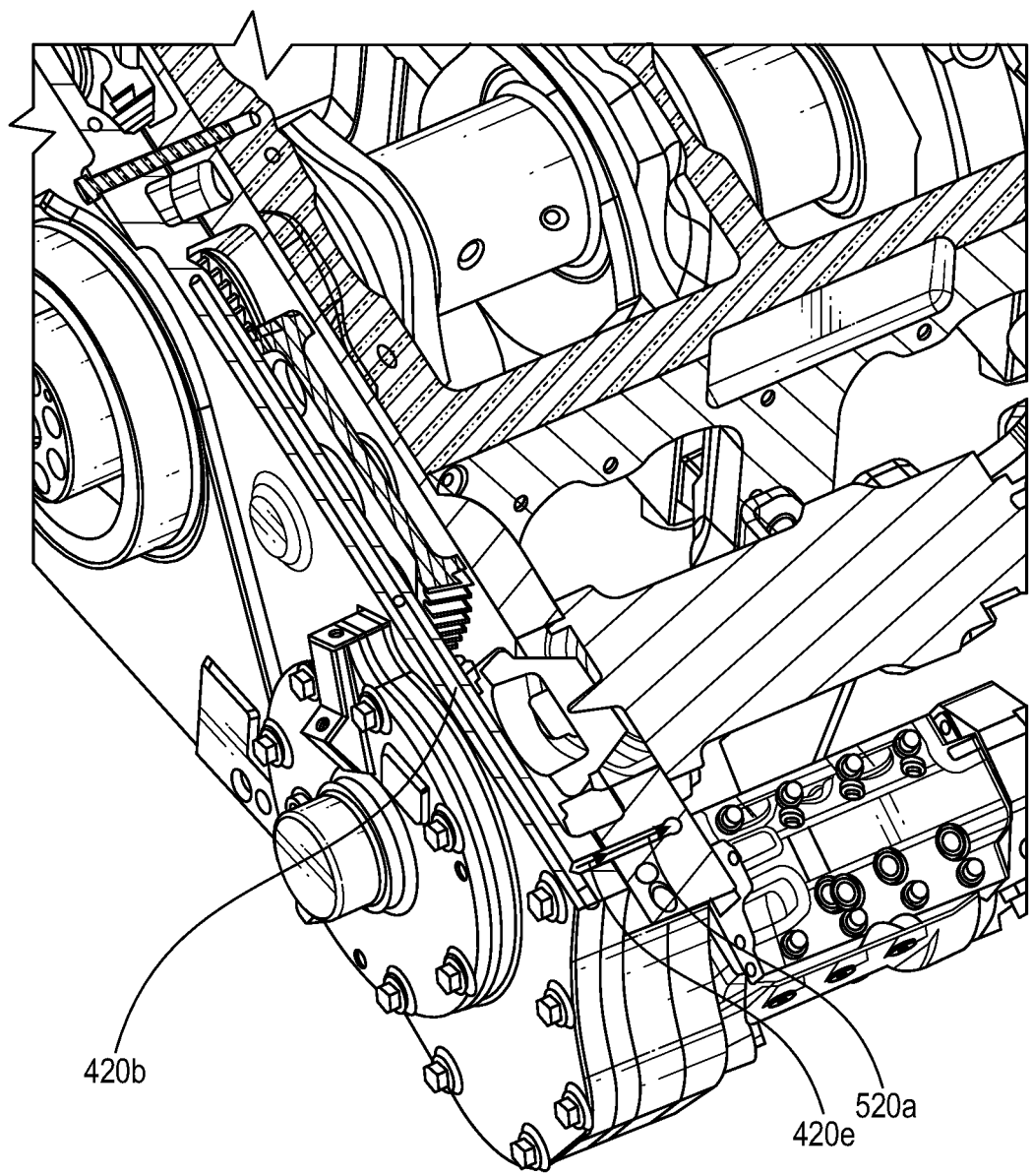
FIG. 9 is a partial perspective cross-sectional view of the gear housing assembly of FIG. 1
Figure 10:
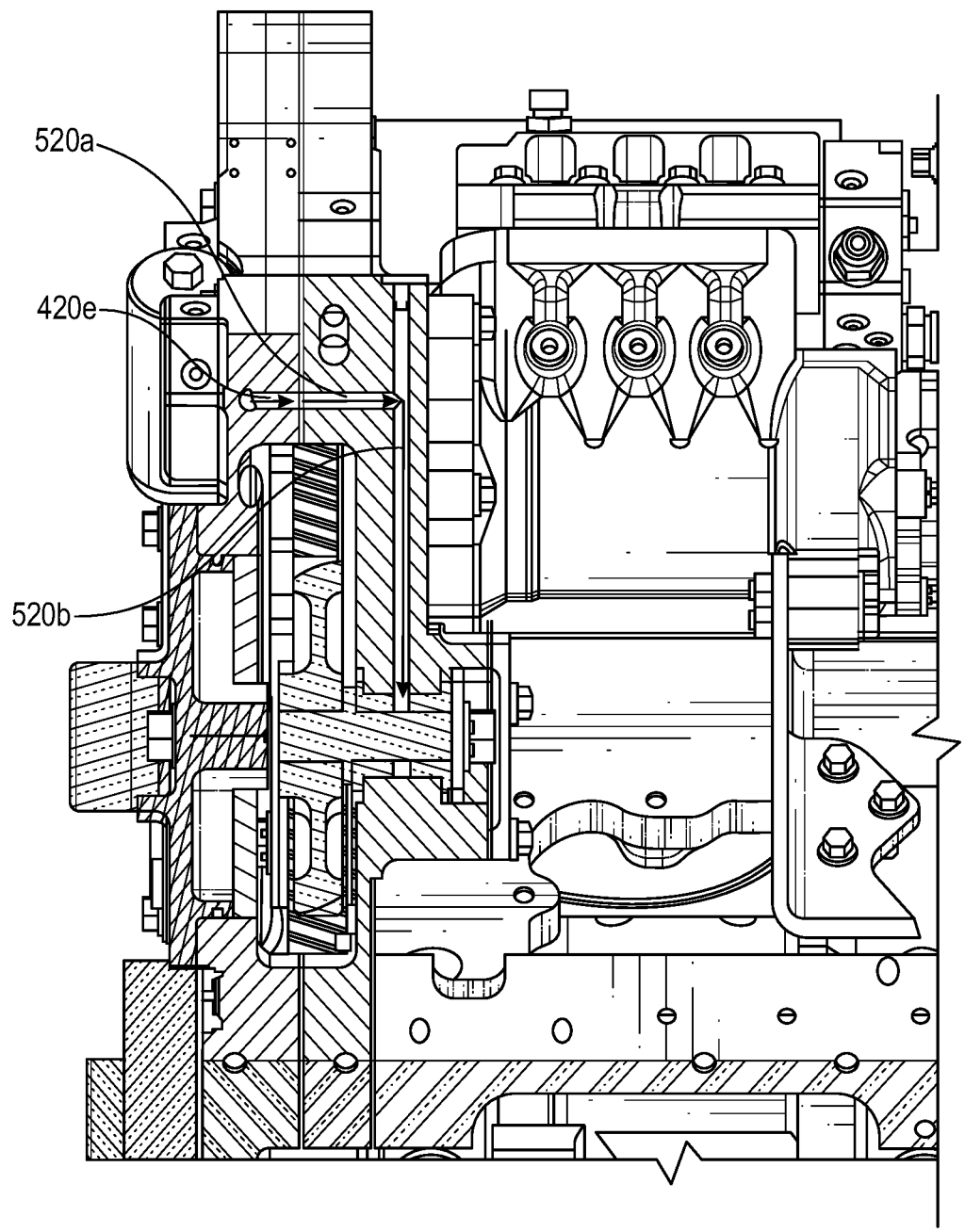
FIG. 10 is a second cross-sectional view of the gear housing assembly of FIG. 1.
Figure 11:
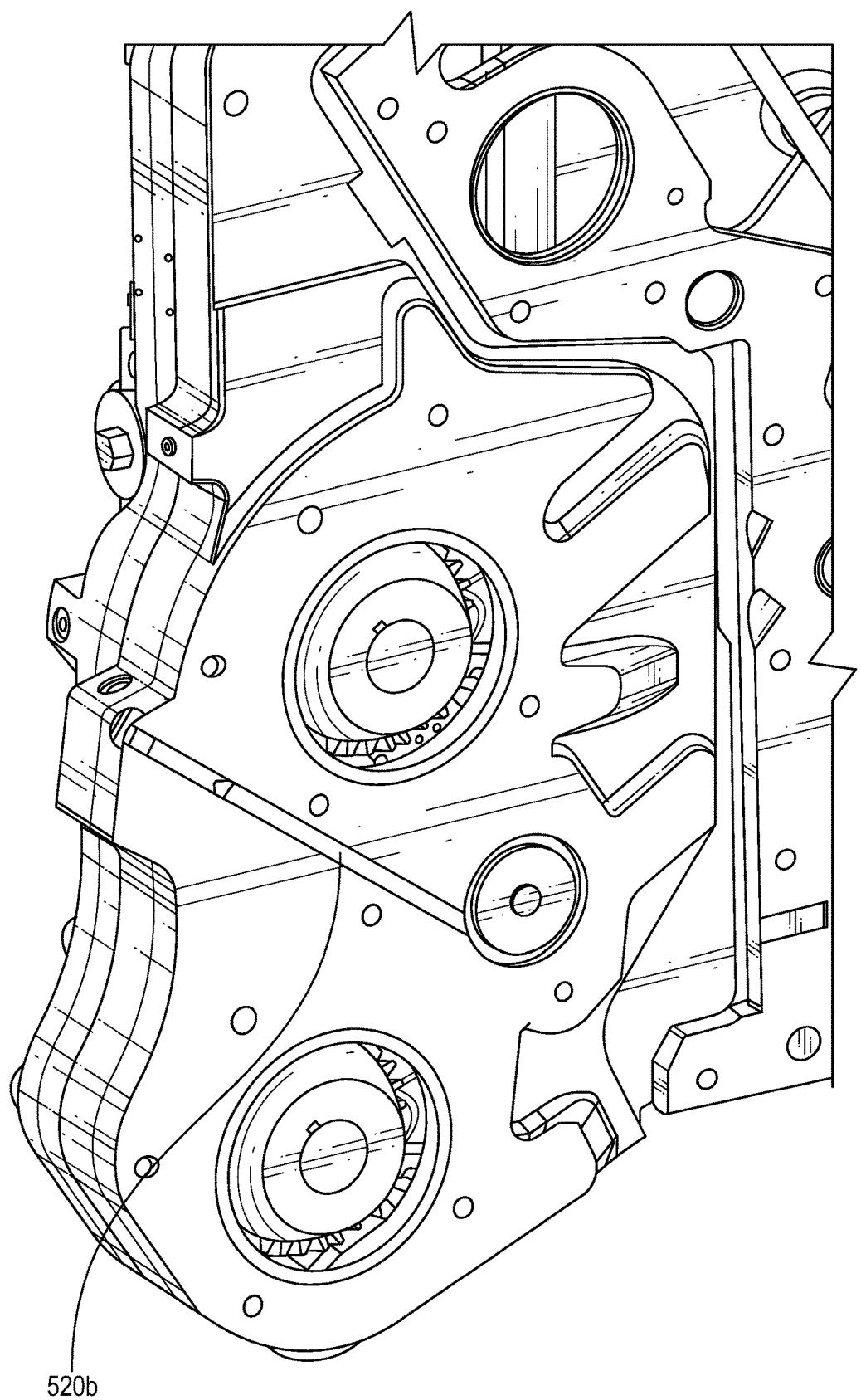
FIG. 11 is a cross-sectional view of the gear housing assembly showing drillings of FIG. 1.
Figure 12:
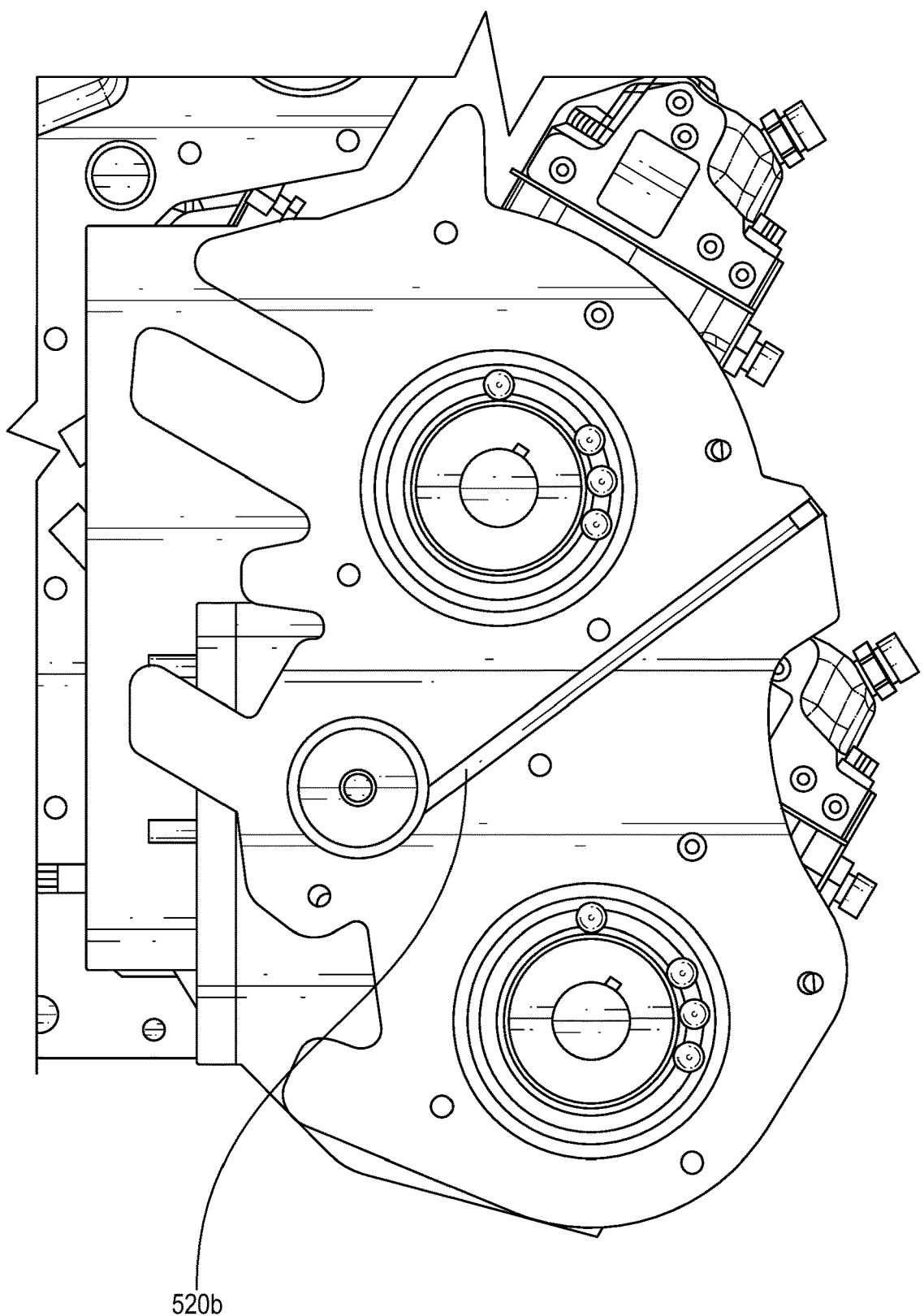
FIG. 12 is a cross-sectional view of the gear housing assembly showing drillings of FIG. 1.

A second plane of oil drillings is illustrated in FIGS. 7-8. In this second plane of oil drillings, an oil path is provided from the first gear cover drilling 120*a* to a ninth gear cover drilling 420*a* that fluidly engages with a tenth gear cover drilling 420*b*. The tenth gear cover drilling 420*b* fluidly engages with an eleventh gear cover drilling 420*c*. The eleventh gear cover drilling 420*c* fluidly engages with a twelfth gear cover drilling 420*d*. The twelfth gear cover drilling 420*d* fluidly engages with access cover drilling 184*a* of access cover 170.

Figure 5:
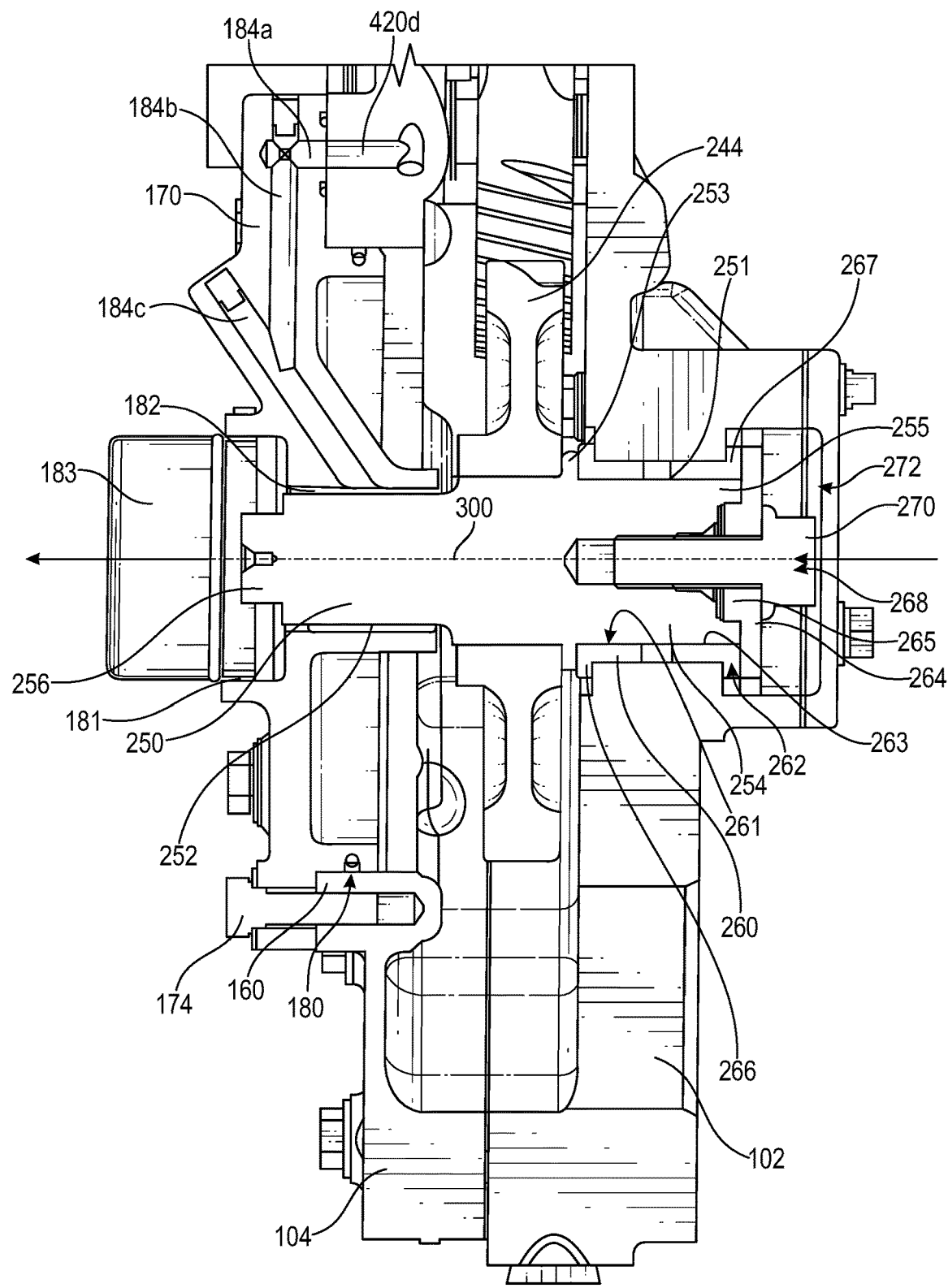
FIG. 5 is a cross-sectional view of the gear housing assembly of FIG. 4.
Figure 6:
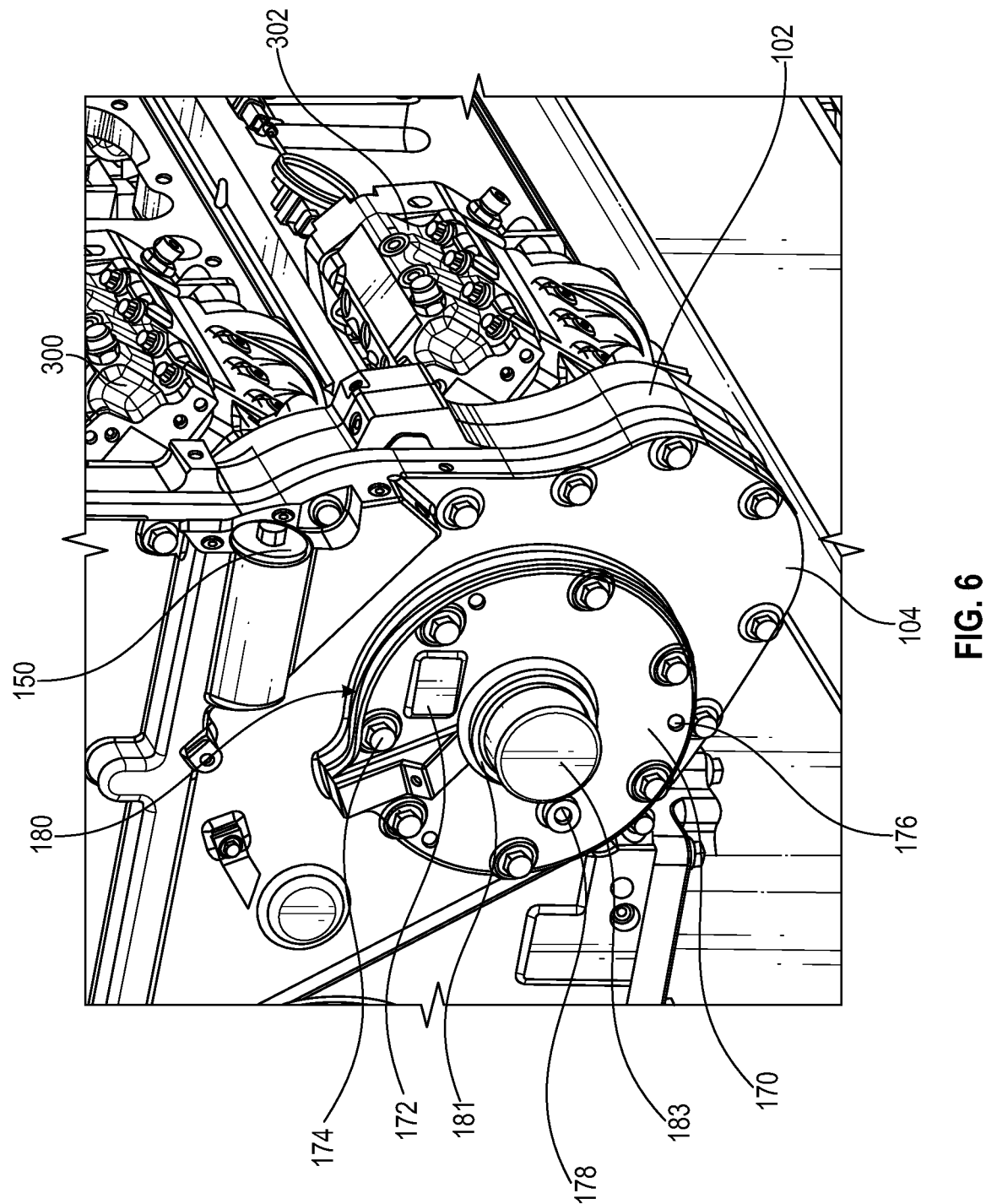
FIG. 6 is a partial perspective front view of the gear housing assembly with an access cover mounted on the gear cover of FIG. 1.

A cross-sectional view of the access cover 170 is illustrated in FIG. 5 and a front view of the access cover 170 is illustrated in FIG. 6. The access cover 170 includes an access cover drilling 184*a* to provide oil to the access cover 170. The access cover 170 includes an access cover drilling 184*b* that fluidly engages the access cover drilling 184*a* and an access cover drilling 184*c* to supply oil to the idle shaft bushing 182. The access cover 170 also includes a raised machined pad 172 that can include part identification information such as a part number, 2D bar code, or other similar information.

The access cover 170 includes one or more bolts or other fasteners 174 that attach the access cover 170 to the gear cover 104 via the one or more bolt holes in the gear cover 104. The access cover 170 includes a raised bolt boss 178 to enable mounting a sheet metal cover/guard over an engine damper (not illustrated). The access cover 170 includes one or more threaded holes 176 which are often referred to as "jacking screw holes". The access cover 170 includes an idler shaft bushing 182. The idler shaft bushing 182 is a press-in-place bushing but may take other forms in other embodiments. The access cover 170 includes an access opening 181 that is covered with a removable cap 183 to prevent oil from leaking out.

To remove the access cover 170, the one or more bolts or other fasteners 174 that hold the access cover 170 onto the gear cover 104 are removed. Then three of the bolts 174 are threaded into the threaded holes 176 to lift or jack the access cover 170 off the gear cover 104. A radial O-ring seal 180 may be positioned between the access cover 170 and the gear cover 104. If the O-ring seal 180 is assembled with the access cover 170, the O-ring seal 180 can get stuck over time due to heat exposure which could make removal of the access cover 170 more difficult. The jacking screw holes 176 allow for easy removal of the access cover 170 with the fasteners 174. Removal of the access cover 170 enables service of a simply supported idler shaft 250 and an idler gear 244.

The gear housing 102 includes a plurality of gear housing drillings 220 that fluidly connect to supply oil to a first fuel pump 300 and a second fuel pump 302. The first fuel pump 300 and the second fuel pump 302 are operably mounted directly to the gear housing 102. The plurality of gear housing drillings 220 include a first gear housing drilling 220a that receives oil from the eighth gear cover drilling 120h. The first gear housing drilling 220a fluidly engages with a second gear housing drilling 220b and a third gear housing drilling 220c to split the oil flow to provide an oil flow path 222a through the second gear housing drilling 220b and another oil flow path 222b through the third gear housing drilling 220c. The second gear housing drilling 220b fluidly aligns with a fourth gear housing drilling 220d that fluidly connects with the first fuel pump 300. The third gear housing drilling 220c fluidly aligns with a fifth gear housing drilling 220e that fluidly connects with the second fuel pump 302.

Turning now to FIG. 4, the gear housing 102 includes a crankshaft opening 230 sized to receive a crankshaft gear 232 and a portion of an engine crankshaft 234. The gear housing 102 includes an idler gear opening 236 sized to receive and mount a mounted idler gear 238. It should be appreciated that the crankshaft opening 230 is large enough to receive the engine crankshaft 234 such that the crankshaft gear 232 is press-fit onto the nose of the engine crankshaft 234. The idler gear opening 236 is large enough to receive the bolted shaft/adapter of the idler gear 238 and the idler gear 238 is mounted off the cylinder block 110. The mounted idler gear 238 is operationally connected to the crankshaft gear 232. The gear housing 102 includes an idler gear opening 242 sized to receive a simply supported idler gear 244 therein. The idler gear opening or bore 242 is similarly sized as the idler shaft opening 160 in the gear cover 104. The idler gear opening or bore 242 is forward of the top hat bushings 260 and 262 such that the idler gear 244 and the idler shaft 250 installs from the front side via the access cover 170 or with the gear cover 104 removed. The gear housing 102 includes a first pump opening 245 sized to receive a first fuel pump gear 247 and the first fuel pump 300 therein. The gear housing 102 includes a second pump opening 246 sized to receive a second fuel pump gear 249 and a second fuel pump 302 therein.

Generally, rotational energy is transferred from the engine crankshaft 234 via crankshaft gear 232 through mounted idler gear 238 through simply supported idler gear 244. The simply supported idler gear 244 then transfers the rotational energy to the first fuel pump gear 247 which in turn drives the first fuel pump 300. The simply supported idler gear 244 also transfers the rotational energy to the second fuel pump gear 249 which in turn drives the second fuel pump 302. The first fuel pump 300 and the second fuel pump 302 are spaced far enough from the cylinder block 110 so that the fuel pumps 300 and 302 and fuel lines attached to the fuel pumps 300 and 302 are accessible. The first fuel pump 300 and the second fuel pump 302 are operated relative to each other at an optimized relative rotational timing to keep gear mesh-loads low. In this case, timing of either fuel pump rotational positions back to the crankshaft is of no concern.

Turning now to FIG. 5, the idler gear 244 is assembled onto an idler shaft 250 as a sub-assembly. In one form, the idler gear 244 is permanently assembled onto the idler shaft 250. The idler shaft 250 includes a front end 252 opposite a rear end 254. The front end 252 includes a hex feature 256 that can receive a tool to hold the hex feature 256 while a bolt 268 is being torqued. The front end 252 is supported on the idler shaft bushing 182 of the access cover 170. The rear end 254 is supported by a first top hat bushing 260 and a second top hat bushing 262 that are mounted in the gear housing 102. The rear end 254 includes a flange 255 that is sized to receive a pilot feature 265 of the retainer 264.

The first top hat bushing 260 and the second top hat bushing 262 provide both radial and thrust load bearing capabilities via hydrodynamic oil films. The first top hat bushing 260 and the second top hat bushing 262 are each a single piece bushing that also control loading in the thrust direction along a Z axis which corresponds to a center line along the idler shaft 250. The hydrodynamic oil films are located between an inner diameter 261 of the first top hat bushing 260 and an inner diameter 263 of the second top hat bushing 262 and an outer diameter 251 of the rear end 254 of the idler shaft 250 to provide radial load bearing capability. There are also hydrodynamic oil films located between an outer portion 266 of the first top hat bushing 260, the idler shaft 250, and an outer portion 267 of the second top hat bushing 262 and the retainer 264 to provide a thrust load bearing capability. Oil is provided to a rear side of the first top hat bushing 260 from the oil drillings illustrated in FIGS. 7-12. There is a hydrodynamic oil film located between an outer portion 266 of the first top hat bushing 260 and shoulder 253 on idler shaft 250 to provide thrust load bearing capability in the rearward direction. There is also a hydrodynamic oil film located between outer portion 267 of the second top hat bushing 262 and the retainer 264 to provide thrust load bearing capability in the forward direction.

The oil path is provided from the first gear cover drilling 120a to the ninth gear cover drilling 420a that fluidly engages with the tenth gear cover drilling 420b. The tenth gear cover drilling 420b fluidly engages with a thirteenth gear cover drilling 420e that fluidly engages with a first gear housing drilling 520a. The first gear housing drilling 520a fluidly engages with a second gear housing drilling 520b that provides oil between the first top hat bushing 260 and the second top hat bushing 262.

A retainer 264 is attached to the rear end 254 of the idler shaft 250 with a bolt 268. The bolt 268 includes a bolt head having a hex feature 270. The retainer 264 includes a pilot feature 265 that helps locate the pilot feature 265 relative to the flange 255 of the idler shaft 254. The interaction of the pilot feature 265 and the flange 255 keeps the retainer 264 centered so the retainer 264 can ride and wear evenly on the second top hat bushing 262 during thrust loads on the idler shaft 250. The retainer 264 provides clearance between the first and the second top hat bushings 260 and 262, and the adjacent idler shaft 250. Dimensioning of the system minimizes forward/rearward end play of the idler shaft 250 and thus end play and wear on idler gear 244. This is accomplished by minimizing the gap between outer portion 266 of first top hat bushing 260 and shoulder 253 on idler shaft 250 and gap between outer portion 267 of second top hat bushing 262 and retainer 264. The assembly of the idler shaft 250 and the retainer 264 can be achieved by applying torque to the hex feature 270 on the bolt 268, and then either A) holding the hex feature 256 on the front of the idler shaft 250 from rotating, or B) use the gear mesh forces on interconnecting gear teeth of the simply supported idler gear 244 and the mounted idler gear 238 to resist gear and idler shaft rotation.

Oil is supplied to the first top hat bushing 260 and the second top hat bushing 262 via the first gear housing drilling 520*a* and the second gear housing drilling 520*b* as described above. The rear of the idler shaft bore in the gear housing 102 is sealed with a small cover plate 272 to prevent oil from leaking out. The idler shaft opening 160 is sized to allow removal of the simply supported idler gear 244 and the idler shaft 250 without removing the gear cover 104 from the gear housing 102.

Beneficially, the gear housing assembly 100 provides oil to the first and second fuel pumps 300 and 302 through the gear housing 102 and the gear cover 104 via the gasketed interface 105 between the gear housing 102 and the gear cover 104. The gear housing assembly 100 provides oil to the access cover 170 to thereby provide oil to the idler shaft 250. The debris screen 150 traps debris in the oil from passing into the first and the second fuel pumps 300 and 302. The debris screen 150 is easily removed for service to clean out the trapped debris.

To access the idler shaft 250, the access cover 170 is removed rather than remove the gear cover 104 which is often extremely hard to reach and cumbersome. This prevents having to removing front end engine components such as a charging alternator and torsional damper which are items that often removed to remove a gear cover. A front engine trunnion support also does not require removal therefore the engine does not need supported by additional means such as a hoist or other supportive mechanisms.

As is evident from the figures and text presented above, a variety of aspects of the present disclosure are contemplated.

Various aspects of the present application are contemplated. According to one aspect, a gear housing assembly for an internal combustion engine, the gear housing assembly comprising: a gear housing including a plurality of gear housing drillings; and a gear cover including a plurality of gear cover drillings, wherein the gear cover is attached to the gear housing such that the plurality of gear cover drillings is fluidly connected with the plurality of gear housing drillings via a gasketed interface between the gear housing and the gear cover.

In one embodiment, the gear housing further comprising: a debris screen positioned in one of the plurality of gear cover drillings.

In another embodiment, the gear housing assembly, further comprising: a first fuel pump attached directly to the gear housing, wherein one of the plurality of the gear housing drillings is fluidly connected to the first fuel pump; and a second fuel pump attached directly to the gear housing, wherein another one of the plurality of the gear housing drillings is fluidly connected to the second fuel pump.

In another embodiment, the gear housing assembly, wherein the gear housing includes a crankshaft opening sized to receive a crankshaft gear and a portion of an engine crankshaft.

According to another aspect, a system for an internal combustion engine, the system comprising: the gear housing assembly of anyone of gear housing assemblies, further comprising: an access cover mounted on the gear cover, wherein the access cover is removable from the gear cover; and an idler gear positioned between the access cover and the gear housing, the idler gear is accessible when the access cover is removed from the gear cover.

According to another aspect, a system for an internal combustion engine, the system comprising: a gear housing assembly including a gear housing connected to a gear cover for the internal combustion engine; an access cover mounted on the gear cover, wherein the access cover is removable from the gear cover; and an idler gear assembled onto an idler shaft to form a sub-assembly, the idler gear positioned between the access cover and the gear housing, wherein the idler gear is accessible when the access cover is removed from the gear cover.

In one embodiment, the system of anyone of the above systems, wherein the gear cover remains assembled with the gear housing when the access cover is removed from the gear cover.

In one embodiment, the system of anyone of the above systems, further comprising: an idler shaft having a front end opposite a rear end, wherein the idler gear is assembled onto the idler shaft; the front end of the idler shaft is supported on an idler shaft bushing assembled with the access cover; the rear end of the idler shaft is supported by a first top hat bushing and a second top hat bushing mounted in the gear housing.

In one embodiment, the system of anyone of the above systems, wherein the gear housing includes a plurality of gear housing drillings, the gear cover including a plurality of gear cover rifle drillings, wherein the gear cover is attached to the gear housing such that the plurality of gear cover rifle drillings is fluidly connected with the plurality of gear housing drillings via a gasketed interface between the gear housing and the gear cover.

In one embodiment, the system of anyone of the above systems, wherein the first top hat bushing and the second top hat bushing are configured to provide radial and thrust load bearing capabilities via a hydrodynamic oil film supplied by one or more of the plurality of the gear housing drillings.

In one embodiment, the system of anyone of the above systems, further comprising: a cover plate configured to seal an idler shaft opening in the gear cover that receives the idler gear and the idler shaft therein.

In one embodiment, the system of anyone of the above systems, wherein the idler shaft opening is sized to enable removal of the idler gear and the idler shaft without removing the gear cover from the gear housing.

In one embodiment, the system of anyone of the above systems, further comprising: a retainer assembled to the rear end of the idler shaft, the retainer configured to provide clearance between the first and the second top hat bushings and the idler shaft.

In one embodiment, the system of anyone of the above systems, wherein the retainer includes a pilot feature configured to locate the pilot feature relative to a flange of the idler shaft to center the retainer.

In one embodiment, the system of anyone of the above systems, further comprising: a bolt having a bolt head with a hex feature, wherein the idler shaft is assembled to the retainer by applying torque to the hex feature of the bolt.

In the above description, certain relative terms may be used such as "up," "down," "upper," "lower," "horizontal," "vertical," "left," "right," "proximal," "distal," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

The described features, structures, advantages, and/or characteristics of the subject matter of the present disclosure may be combined in any suitable manner in one or more embodiments and/or implementations. In the following description, numerous specific details are provided to impart a thorough understanding of embodiments of the subject matter of the present disclosure. One skilled in the relevant art will recognize that the subject matter of the present disclosure may be practiced without one or more of the specific features, details, components, materials, and/or methods of a particular embodiment or implementation. In some instances, the benefit of simplicity may provide operational and economic benefits and exclusion of certain elements described herein is contemplated as within the scope of the invention herein by the inventors to achieve such benefits. In other instances, additional features and advantages may be recognized in certain embodiments and/or implementations that may not be present in all embodiments or implementations. Further, in some instances, well-known structures, materials, or operations are not shown or described in detail to avoid obscuring aspects of the subject matter of the present disclosure. The features and advantages of the subject matter of the present disclosure will become more fully apparent from the following description and appended claims, or may be learned by the practice of the subject matter as set forth hereinafter.

The present subject matter may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A gear housing assembly for an internal combustion engine, the gear housing assembly comprising:
    a gear housing including a rear face configured for assembly to a block of the internal combustion engine, the gear housing including a front face opposite the rear face, and the gear housing including a plurality of gear housing drillings;
    a gear cover including a rear face for attachment to the front face of the gear housing to form a gasketed interface between the gear housing and the gear cover, the gear cover including a front face opposite the rear face of the gear cover, the gear cover including a plurality of gear cover drillings, wherein the gear cover is attached to the gear housing such that the plurality of gear cover drillings is fluidly connected with the plurality of gear housing drillings via the gasketed interface between the gear housing front face and the gear cover rear face; and
    a debris screen in one of the plurality of gear cover drillings, the debris screen configured to trap debris in oil flowing through the plurality of gear cover drillings before the oil passes to the plurality of gear housing drillings.

2. The gear housing assembly of claim 1, wherein the debris screen includes a removable end that is located on the front face of the gear cover, the removable end configured to enable removal of the debris screen from the one of the plurality of gear cover drillings.

3. The gear housing assembly of claim 1, further comprising:
    a first fuel pump attached directly to the gear housing, wherein one of the plurality of the gear housing drillings is fluidly connected to the first fuel pump; and
    a second fuel pump attached directly to the gear housing, wherein another one of the plurality of the gear housing drillings is fluidly connected to the second fuel pump.

4. The gear housing assembly of claim 1, wherein the gear housing includes a crankshaft opening sized to receive a crankshaft gear and a portion of an engine crankshaft.

5. A system for an internal combustion engine, the system comprising:
    the gear housing assembly including:
        a gear housing including a rear face configured for assembly to a block of the internal combustion engine, the gear housing including a front face opposite the rear face, and the gear housing including a plurality of gear housing drillings;
        a gear cover including a rear face for attachment to the front face of the gear housing to form a gasketed interface between the gear housing and the gear cover, the gear cover including a front face opposite the rear face of the gear cover, the gear cover including a plurality of gear cover drillings, wherein the gear cover is attached to the gear housing such that the plurality of gear cover drillings is fluidly connected with the plurality of gear housing drillings via the gasketed interface between the gear housing front face and the gear cover rear face;
        a debris screen in one of the plurality of gear cover drillings, the debris screen configured to trap debris in oil flowing through the plurality of gear cover drillings before the oil passes to the plurality of gear housing drillings; and
    an access cover mounted on the gear cover, wherein the access cover is removable from the gear cover; and an idler gear positioned between the access cover and the gear housing, the idler gear is accessible when the access cover is removed from the gear cover.

6. The system of claim 5, further comprising an idler shaft that includes a front end opposite a rear end, the front end of the idler shaft is supported by the access cover, the rear end of the idler shaft is supported by a first top hat bushing and a second top hat bushing mounted in the gear housing.

7. A system for an internal combustion engine, the system comprising:
a gear housing configured for assembly to a block of the internal combustion engine;
a gear cover connected to the gear housing opposite the internal combustion engine;
an access cover mounted on the gear cover, wherein the access cover is removable from the gear cover;
an idler shaft extending between a front end and an opposite rear end, wherein the front end is rotatably supported by the access cover and the rear end is supported by the gear housing; and
an idler gear assembled onto the idler shaft to form a sub-assembly, the idler gear positioned between the access cover and the gear housing, wherein the idler gear is accessible when the access cover is removed from the gear cover without removing the gear cover from the gear housing.

8. The system of claim 7, wherein the gear cover remains assembled with the gear housing when the access cover is removed from the gear cover.

9. The system of claim 7, wherein:
the front end of the idler shaft is supported on an idler shaft bushing assembled with the access cover;
the rear end of the idler shaft is supported by a first top hat bushing and a second top hat bushing mounted in the gear housing.

10. The system of claim 9, wherein the first top hat bushing and the second top hat bushing are configured to provide radial and thrust load bearing capabilities via a hydrodynamic oil film supplied by one or more of a plurality of the gear housing drillings.

11. The system of claim 9, further comprising:
a retainer assembled to the rear end of the idler shaft, the retainer configured to provide clearance between the first and the second top hat bushings and the idler shaft.

12. The system of claim 11, wherein the retainer includes a pilot feature configured to locate the pilot feature relative to a flange of the idler shaft to center the retainer.

13. The system of claim 12, further comprising:
a bolt having a bolt head with a hex feature, wherein the idler shaft is assembled to the retainer by applying torque to the hex feature of the bolt.

14. The system of claim 7, wherein the gear housing includes a plurality of gear housing drillings, the gear cover including a plurality of gear cover rifle drillings, wherein the gear cover is attached to the gear housing such that the plurality of gear cover rifle drillings is fluidly connected with the plurality of gear housing drillings via a gasketed interface between the gear housing and the gear cover.

15. The system of claim 7, further comprising:
a cover plate configured to seal an idler shaft opening in the gear cover that receives the idler gear and the idler shaft therein.

16. The system of claim 15, wherein the idler shaft opening is sized to enable removal of the idler gear and the idler shaft without removing the gear cover from the gear housing.

17. The system of claim 5, further comprising:
a cover plate configured to seal an idler shaft opening in the gear cover that receives the idler gear and the idler shaft therein.

18. The system of claim 5, wherein the gear cover remains assembled with the gear housing when the access cover is removed from the gear cover.

19. The system of claim 5, wherein the debris screen includes a removable end that is located on the front face of the gear cover, the removable end configured to enable removal of the debris screen from the one of the plurality of gear cover drillings.

20. The system of claim 6, wherein the first top hat bushing and the second top hat bushing are configured to provide radial and thrust load bearing capabilities via a hydrodynamic oil film supplied by one or more of the plurality of gear housing drillings.

* * * * *